(12) United States Patent
Boatwright et al.

(10) Patent No.: US 7,580,395 B2
(45) Date of Patent: Aug. 25, 2009

(54) INFORMATION GATHERING APPARATUS AND METHOD HAVING MULTIPLE WIRELESS COMMUNICATION OPTIONS

(75) Inventors: Darrell L. Boatwright, Cedar Rapids, IA (US); Ryan R. White, Ankeny, IA (US)

(73) Assignee: Intermec IP Corp., Everett, WA (US)

( * ) Notice: Subject to any disclaimer, the term of this patent is extended or adjusted under 35 U.S.C. 154(b) by 1069 days.

(21) Appl. No.: 10/307,221

(22) Filed: Nov. 29, 2002

(65) Prior Publication Data

US 2004/0105411 A1 Jun. 3, 2004

(51) Int. Cl.
*H04W 4/00* (2009.01)
(52) U.S. Cl. ............... 370/338; 370/329; 455/168.1
(58) Field of Classification Search .......... 455/168.1; 370/338, 329
See application file for complete search history.

(56) References Cited

U.S. PATENT DOCUMENTS 7,415,293 B1* 8/2008 Lee ........................... 455/574
2002/0137472 A1* 9/2002 Quinn et al. .................. 455/90
2002/0198028 A1* 12/2002 Tsumura ..................... 455/564
2003/0040292 A1* 2/2003 Peterzell et al. ............. 455/147
2003/0235167 A1* 12/2003 Kuffner ...................... 370/335
2003/0236104 A1* 12/2003 Lin .......................... 455/556.1
2005/0059399 A1* 3/2005 Raval et al. ................. 455/436
2005/0202853 A1* 9/2005 Schmitt et al. ............ 455/569.2
2008/0163024 A1* 7/2008 Lakkis ....................... 714/752

* cited by examiner

*Primary Examiner*—Patrick N. Edouard
*Assistant Examiner*—Justin Y Lee
(74) *Attorney, Agent, or Firm*—Shook, Hardy & Bacon L.L.P.

(57) ABSTRACT

An information handling apparatus, and a method, having a plurality of wireless communication systems is disclosed. The apparatus can include three radio-frequency communication components. In another embodiment, the device can include four wireless communication systems. In one embodiment, the communication systems can communicate simultaneously.

10 Claims, 8 Drawing Sheets

INFORMATION GATHERING APPARATUS AND METHOD HAVING MULTIPLE WIRELESS COMMUNICATION OPTIONS

BACKGROUND OF THE INVENTION

Information handling devices capable of wireless communication are well known. Such devices are used to gather data and to communicate the gathered data to some other device or devices. In some devices, the data is gathered by entering it manually via a component such as a keyboard, keypad, touch screen, or a digitizer screen or pad. Some information handling devices also provide for automated data entry. Automated data entry is accomplished via a radio frequency identification (RFID) reader component or via an optical indicia reader component. The optical indicia reader can be a component such as a laser scanner component or a digital imager.

When an information handling device includes a wireless communication component, it uses either a radio transceiver component or an optical communication component such as an infrared transceiver (an IRDA compliant transceiver for example) to handle the communication. When radio communication is desired, a radio transceiver system is chosen that can communicate via a frequency and a communication protocol that is compatible with the type of wireless network that will be encountered. Thus, a WAN radio frequency transceiver is included in a device that will communicate over a wireless wide area network (WAN). A LAN radio frequency transceiver is included in an information handling device that will communicate over a wireless local area network (LAN). Similarly, a device that will communicate via infrared signals will include an IRDA transceiver. local area network (LAN). Similarly, a device that will communicate via infrared signals will include an IRDA transceiver.

Information handling devices that are portable are also known. Such devices are designed to be carried in a vehicle or by an operator. Consequently, a portable device can encounter a wide variety of work sites and communication environments. For example, a portable unit used in a route delivery application will be located in a rural or an urban area when the delivery vehicle is in transit, in a depot or warehouse when the vehicle arrives at a site and in locations removed from the vehicle when it is carried by an operator after arriving at a site. At various times during such use, the device may need to communicate via a wireless WAN. At other times, for example, it may be at a site containing a wireless LAN.

The problem with the prior devices, however, is that they have been capable of communicating in just one, and at most two, of the various radio frequency communication environments at any one time. For example, some information handling devices are capable of communicating via a wireless WAN and a wireless LAN, but not by a third type of wireless radio frequency network. Other such devices exist that are capable of communicating via a WAN, a LAN and via an IRDA transceiver, but not via a wireless PAN transceiver. Consequently, with the prior devices, it is common to encounter several situations where a given mode of communication is not available.

A new information handling device is needed that can wirelessly communicate regardless of its location. For example, it is desired to design an information handling device that is capable of communicating via any of four different wireless communication components. It is also desired to create an information handling device capable of communicating via three or more different radio frequency networks. It is further desired to create units that can simultaneously communicate via three or more different wireless networks. In addition, such devices are needed that are also portable or capable of being hand held. Further, it is believed that a review of this specification, including its claims and drawings, will reveal and imply additional deficiencies of the prior systems that are improved or remedied by the inventions disclosed herein.

SUMMARY OF THE INVENTION

The specification presents several embodiments related to an information handling device having a plurality of communication options. The inventions also relate to a device having three or more wireless communication systems. In one embodiment, the device supports a wireless WAN system, a wireless LAN system and a wireless PAN system for simultaneous operation. The device can be, for example, a portable hand-held device that also includes manual data entry systems, automated data entry systems or both. For example, the device can include a keyboard or keypad, a touch sensitive or digitizer panel, a display, and an optical indicia reader or digital imager. Further, reference to the accompanying drawings, detailed description and claims will reveal additional features related to the various embodiments.

DETAILED DESCRIPTION

The need for wireless communication is evolving as the wireless infrastructure continues to expand. Businesses are using wireless computer terminals to increase productivity and save time in many different applications. The inventions disclosed throughout this specification incorporate the use of multiple wireless technologies. These inventions will enable a user to employ wireless communication in many applications that have been previously implemented only as wired applications.

For example, a route driver working throughout a city can communicate throughout the day with dispatchers using an information handling device outfitted with a WAN radio to receive sales updates, route changes, directions, audio communications, etc. Upon returning to the depot, the driver or other type of user can communicate via a LAN transceiver of the information handling device to receive large amounts of data such as existing route day information, next day route information, software updates, mapping info, etc. In addition, a PAN transceiver can be used as a cable replacement to communicate to a printer, or communicate with any other wireless PAN compatible device such as a cell phone.

Further, with the addition of a bar code laser scanner or a digital imager, the user can send real-time scanned bar code data, images, or other optical indicia or information to a host computer. This enables the real time updating of databases storing information related to inventories and other data collection. With the digital imager the user can take digital pictures of anything and transmit them using any of the available wireless radio technologies.

Figure 1:
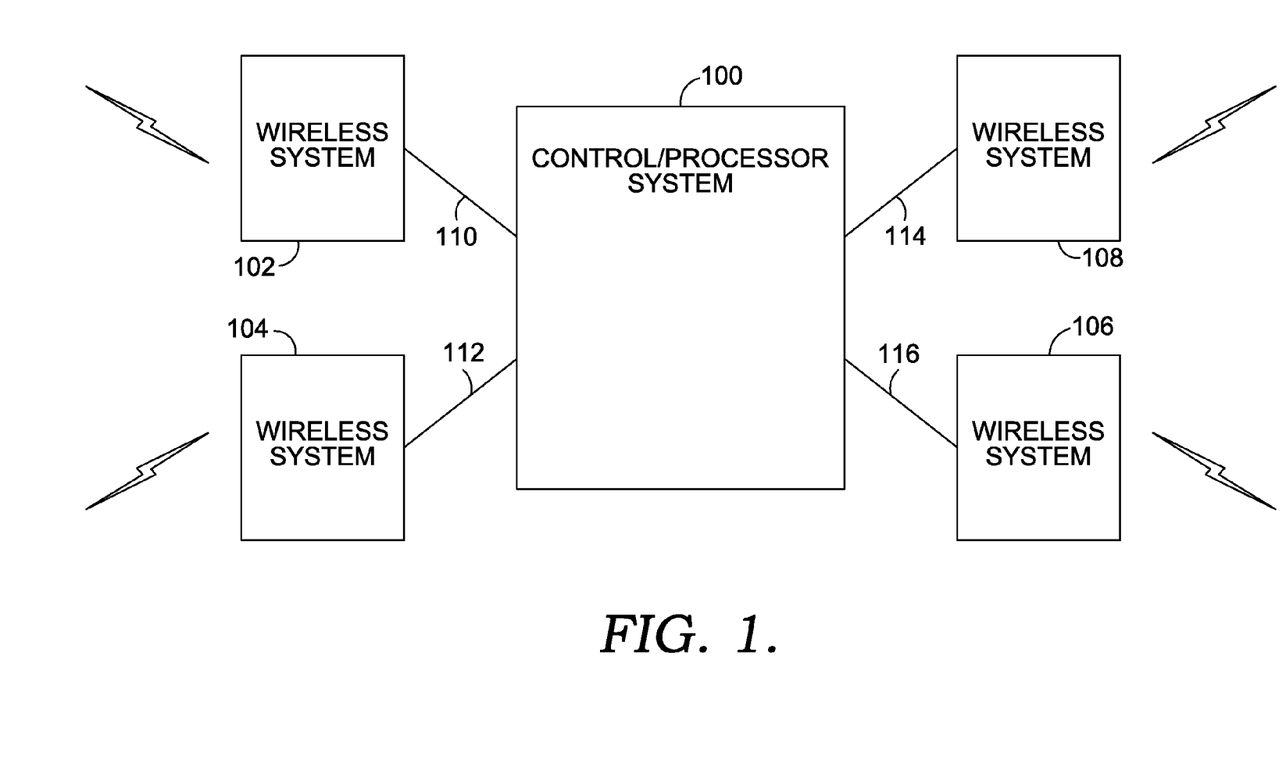
FIG. 1 depicts a block diagram related to an information handling device having a plurality of wireless communication options.

FIG. 1 presents a basic block diagram related to an information handling device having a plurality of wireless communication options. FIG. 1 depicts a control or processing system 100 coupled with four wireless communication systems 102, 104, 106, 108. The wireless communication systems 102, 104, 106, 108 can be any of a wide variety of such systems. The wireless systems can be, for example, radio frequency communication systems or optical communication systems or some combination thereof.

As depicted in FIG. 1, the wireless communication systems 102, 104, 106, 108 are coupled 110, 112, 114, 116 with the control or processor system 100. It will be appreciated, however, that the wireless communication systems 102, 104, 106, 108 need not be directly coupled with the control or processor system 100. Other components can, and often will, be coupled between a wireless communication system and the control or processor system. Thus, any of the wireless communication systems may be indirectly rather than directly coupled with the control or processor system. Indirect connectivity is depicted, for example, in FIG. 2.

In FIG. 1, each of the wireless communication systems 102, 104, 106, 108 are represented as a distinct and separate block. It will be appreciated, however, that the functionality of any two or more of the wireless communication systems 102, 104, 106, 108 can be combined into a single hardware component. Thus, the representation of the various distinct systems as separate blocks in FIG. 1, is not intended to imply that each system must be contained in a separate hardware component. Two or more radio frequency communication systems, for example, could be housed partially or completely in the same hardware component, module, card, etc.

In one embodiment of the present invention, the information handling device includes three radio frequency transceivers. Thus, in terms of FIG. 1, three of the wireless communication systems 102, 104, 106 would be radio frequency transceivers and the fourth wireless communication system 108 would not be included. The three radio frequency transceivers preferably have different properties so as to give added functionality to the information handling device in which they are contained. In one such embodiment, one of the wireless communication systems 102 is a wireless WAN transceiver, one of the wireless communication systems 104 is a wireless LAN transceiver and the third wireless communication system is a wireless PAN transceiver.

A related embodiment includes four radio frequency communication systems. In this embodiment, the four transceivers 102, 104, 106, 108 can be any combination chosen from a wireless WAN transceiver, a wireless LAN transceiver, a wireless PAN transceiver, a Global Positioning System (GPS) transceiver or a Satellite radio transceiver.

Another embodiment is an information handling device that includes four or more wireless communication systems. The communication systems can be chosen from the list of radio frequency transceivers presented above and can also include an optical communication system such as an IRDA transceiver as one or more of the wireless communication components.

Further, the information handling devices described throughout this specification can include one or more manual or automated data entry components. The manual data entry components can be, for example, a keyboard, keypad, touch screen, or a digitizer screen or pad. The automated data entry components can be an RFID reader component or an optical indicia reader component such as a laser scanner component or a digital imager. A digital imager can be used for many applications such as capturing photos, movies or optical indicia such as characters or one-dimensional and two-dimensional codes.

Another aspect of the present invention is that the wireless communication components can be operated simultaneously. Thus, in an embodiment including wireless WAN, LAN and PAN transceivers, the device can, for example, be simultaneously communicating with a printer or cellular telephone via the PAN, a local site via the LAN and a remote site (a home base for example) via the WAN. If desired, different information could be sent to each of the three simultaneously.

In another application, an information handling device may want to send the same information via all of its wireless communication systems (simultaneously or non-simultaneously). For example, it may be desired to send a record of a dealing with a customer simultaneously to a printer or other personal network device (PAN), the customer's or servicer's local network (LAN) and to a remote site or home office of the customer or servicer. The dealing with the customer may be, for example, the record of a sale or a payment. It may alternatively or additionally involve the digital imaging of a damaged, delivered or purchased article and the transmission of the image via the networks as described. The dealing may be a record of some other type of communication with a second party such as a customer or business associate.

A wide variety of radio transceivers are available. The WAN transceiver can be, for example, a General Packet Radio Service (GPRS) or a Code Division Multiple Access (CDMA) transceiver. The LAN transceiver can be an 802.11b compliant transceiver. The PAN transceiver can be a Bluetooth serial module. Thus, in one embodiment, a WAN (GPRS or CDMA), a PAN (Bluetooth), and a LAN (802.11b) can co-exist and operate simultaneously in a portable, hand-held and lightweight device. The various radio transceivers listed here will be discussed further in relation to FIG. 2 below.

Many different components can be chosen for the control/processor component 100. For example, an Intel X-SCALE Microprocessor, coupled with an SDRAM of 64 to 128 megabytes, has proven sufficient for the tasks described. By way of further example, the processor can be an Intel Pentium class or an AMD X86 class. A suitable operating system is the Microsoft Pocket PC 2002 system. Other operating systems can also be used.

The information handling device of FIG. 1 can be housed and supported by a portable, hand-held and lightweight housing. For example, the systems described in relation to FIGS. 2 through 9 can be housed in a package weighing approximately sixteen ounces and having dimensions of 3.5"×7.5"×

1.75". In a scaled-down version of the device, the weight and dimensions can be even further reduced.

Figure 2:
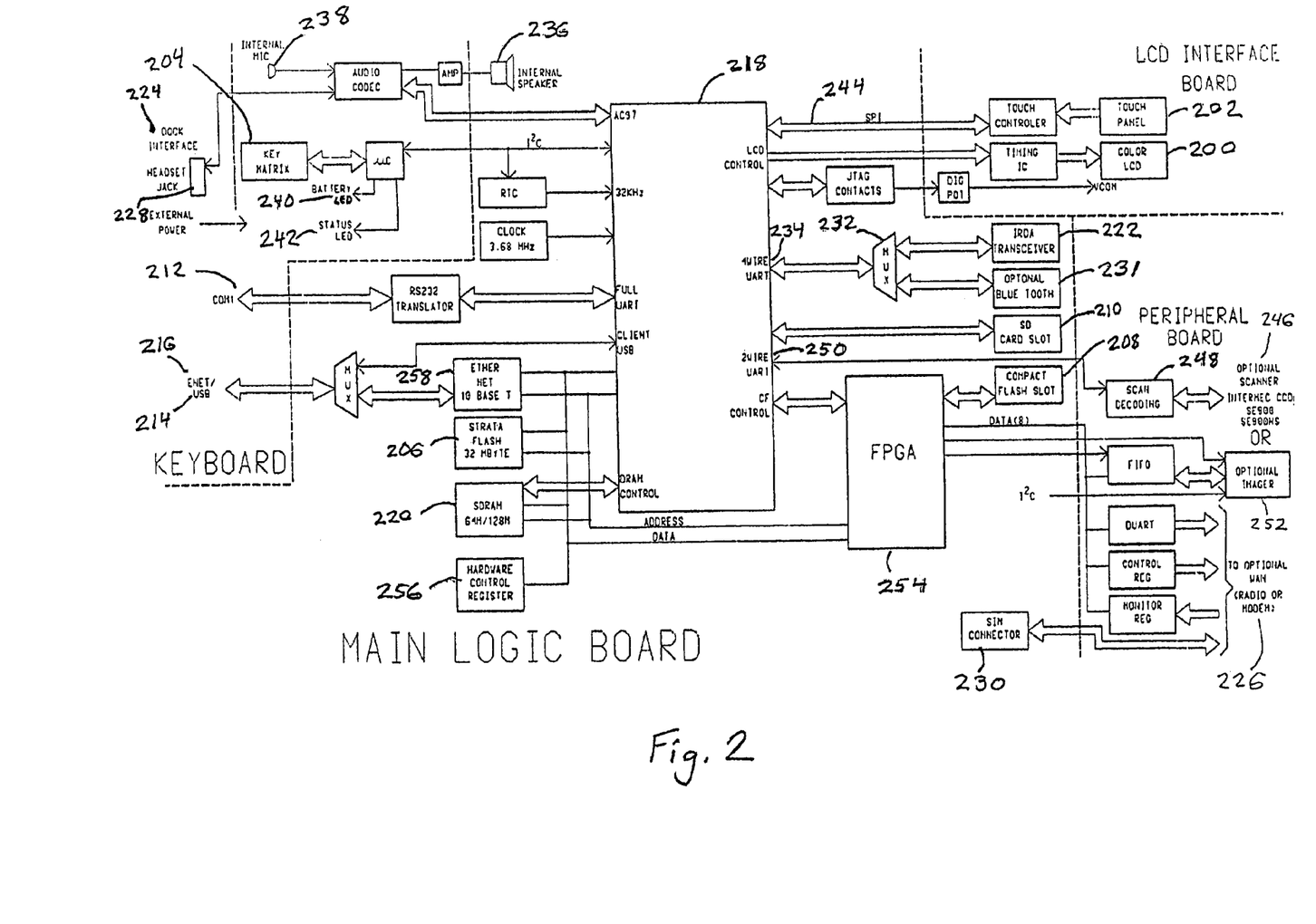
FIG. 2 is a block diagram depicting an embodiment of an information handling device including three radio frequency transceivers and an optical communication transceiver.

FIG. 2 is a block diagram depicting an embodiment of an information handling device including three radio frequency transceivers and an optical communication transceiver. Thus, FIG. 2 presents a detailed instance of the inventions described in relation to FIG. 1. Any of the systems or subsystems depicted in FIG. 2 can be used in combination with any of the embodiments described with respect to FIG. 1. Likewise, FIG. 2 can be adapted to express an instance of the various embodiments described in relation to FIG. 1.

If desired, the features of FIG. 2 can be part of a ruggedized, battery-powered, pen-based computing device including a color, quarter-VGA resolution screen 200 with touch and stylus input 202, a data entry keypad 204, a Flash based program storage 206, an expansion capability for data storage (Compact Flash 208 and SD 210), communication options, connectivity through a true RS-232 serial port 212, a USB (client) 214, and Ethernet capability 216. The base design can have additional flexibility so that different configurations can be developed quickly. The unit can be weather resistant and ruggedized so as to withstand a five foot drop twenty-six times, all edges, sides and corners being IP64 compliant. The unit can have a recommended temperature operating range of from 0° C. to 50° C. The extreme temperature operating range being from −10° C. to 60° C.

The embodiment of FIG. 2 can be based on an Intel X-Scale microprocessor (operating at 400 MHz for example) 218. It can include 64 megabytes of SDRAM (which can be expanded to 128 megabytes) 220. The main operating system storage can be an embedded 32 megabytes of Flash (which can be expanded to 64M) 206.

The Compact Flash slot 208 is capable of receiving Type II CF cards. The Compact Flash (CF) slot 208 can be used, for example, to couple a Compact Flash Card or a CF 802.11b radio frequency transceiver to the device. The Compact Flash slot 208 is buffered from the CPU to allow the card slot 208 to be powered off and allow unit operation. The user can remove an access door via two screws to gain access to the Compact Flash slot 208.

The Secure Digital (SD) Slot 210 can be used to couple Flash Cards (32 megabyte, 64 megabyte, 128 megabyte) as well as future-developed SD I/O cards. The SD slot 210 supports 3.3 VDC cards. Power to the SD slot 210 can be maintained at low consumption levels in Suspend mode. This slot is user accessible by removing an end door of the unit. The SD slot 210 can be used, for example, to store data and applications on an SD Flash card. The implementation is with the lower transfer speed method that is supported directly by the X-Scale processor 218. The four bit parallel SD interface is not possible directly from the X-Scale processor 218.

The operating system can be the Pocket PC 2002 operating system. The standard operating system is from Flash. The system is also capable of being booted from the SD 210 or CF 208. In addition, both cold and warm reset capabilities are supported. The system can include the Intermec 2D Imager Host Decoding Software for Hand Held Products Imager. It also has the ability to add and update custom configuration files, such as .cab files, in manufacturing base on product configuration. The system software can be completely updated by the user. Flash upgrades conforming to the Microsoft XIP Flash update specifications are possible for the embedded Flash. Joint Test Action Group (JTAG) lines can be available to upgrade the bootstrap loader.

The power supply for the unit can be a user-accessible, 3.3 V, quick-change battery (i.e., the battery is replaceable without the use of tools). The battery pack can be a two cell Li-Ion pack with a 2000+ mA hr capacity (14.4 Watt Hours). The battery can typically be operated for six to eight hours on a full charge heavy use profile (with power-management systems enabled, and dependent upon options implemented). The main item effecting battery life is the use of the Liquid Crystal Display (LCD) front light. ITL Standard Run down test (with no front light, no radios/scanning) provides results near 10 hours. Charging is thru a Hirose Connector. The charging power range is from 10 to 30 volts, for simple integration in 12 or 24 volt vehicles. The battery pack charge time is less than 4 hours.

The back up battery is a SUPERCAP that provides power to support the terminal in Suspend state when the main battery is either discharged or removed. System status is maintained in Suspend when the main battery is removed. If the unit is suspended before battery removal, it can typically be maintained for twenty minutes for 64 Mbyte low power chips and fifteen minutes for 128 Mbyte low power chips. The system permits the main battery pack to be removed without the requiring the user to put the unit into Suspend before removal.

In addition to the radio connectivity options discussed throughout this specification, the information handling device can also include several other communication and connectivity options. It can include, for example, a true seven signal RS-232 serial port 212 and an Ethernet connector 216. The unit can include an embedded 10 BASE T Ethernet control chip (which can rely on a dock for an Ethernet transformer). Further, if desired, the embodiment of FIG. 2 can include a 16-pin cell-phone style docking connector (a Hirose connector) (see 330, FIG. 3) that can provide connectivity for Ethernet, Serial and power.

An IRDA transceiver (up to 115.2 K) 222 having a one meter range can also be included. In addition, a USB client 214, having the ability to detect a Host USB connection, can be included. Further, a power input is provided for battery charging. A 3.3 VDC@0.5 A connection is provided for powering peripherals. A dock control signal 224 is provided to support a dock with internal A/B switch.

The FIG. 2 embodiment includes a processor 218 and four wireless communication systems. One of the radio frequency transceivers is a wireless WAN transceiver 226. Specifically, the wireless WAN transceiver 226 of this embodiment can be either a GPRS or a CDMA transceiver. Other types of wireless WAN transceivers, however, can alternatively or additionally be used.

The GPRS functionality can be provided using an Intel (Xircom) GEM or Siemens OEM radio module. The GPRS radio supports normal Global System for Global Communications (GSM) voice and data functionality as well. The voice interface is integrated into the audio system of this information handling device. A headset interface 228 can support the GSM voice calls. The radio provides an input and output audio gain control, which can be controlled via software. As in all GSM systems, Time Division Multiple Access (TDMA) noise is a concern. TDMA noise can be at least 35 dB below a 1 KHz tone at a middle volume setting.

The GPRS radio system features include: GSM voice and circuit switched data (transparent and non-transparent); GPRS class B up to Multi-Slot class 10; Mobile originated and terminated SMS; Tri band (900/1800/1900 MHz) operation; 2W@900 MHz, 1W@1800/1900 MHz transmit power; and GSM/GPRS Phase 2+ compliance.

The GPRS antenna of the embodiment of FIG. 2 can be an external whip antenna using a standard SubMiniature version A (SMA) connector. Two antennas can be included, a dual band 900/1800 MHz for most countries, and a 1900 MHz for PCS band operation (North America). The external whip antenna can be approximately three inches in length. If the information handling device is dropped, the antenna may be damaged, but the unit itself will not be damaged (see description below with regard to FIGS. 3, 4 and 5 regarding drop protection features).

A hardware control is provided so that software can control whether or not the GPRS radio is powered during suspend mode. If the GPRS transceiver remains powered during a suspend state of the information handling device, activity on the RI pin from the GPRS radio will resume the computer. Thus, in this mode of operation, the device can be essentially in a sleep mode, but the radio transceiver can still watch for incoming communications.

A customer accessible Subscriber Identity Module (SIM) card socket 230 can also be provided in conjunction with the embodiment of FIG. 2. The SIM socket 230 can be accessed through a door in the front of the information handling device (see 504, FIG. 5). A switch can be added to power down or suspend the unit when a SIM card is removed.

When the wireless WAN transceiver 226 is a CDMA radio system, the CDMA functionality can be provided by using a Sierra Wireless SB555 OEM radio module for the wireless WAN transceiver 226. This radio module enables the information handling device to support 1XRTT high speed packet data services, circuit switched data, SMS and voice. The features of this particular CDMA transceiver include: support for 1XRTT, IS95A and IS95B CDMA networks (CDMA 2000); Dual band operation—800 MHz North American Cellular and 1900 MHz PCS; support for SMS, async data and facsimile; 200 mW RF output; 153.6 maximum forward channel data rate and 76.8 Kbps reverse channel data rate (dependant upon CDMA network operator); and Quick Net Connect support.

The CDMA voice interface can be integrated into the audio system. The headset interface 228 can support the CDMA voice calls. Further, the CDMA transceiver can provide an input and output audio gain control that can be controlled via software.

The CDMA antenna of this embodiment can be a dual band 800/1900 MHz external whip antenna using a standard SMA connector. The external whip antenna can be approximately three inches in length. Antenna placement of both the GPRS and the CDMA transceivers is discussed below in relation to FIG. 3.

As with the GPRS transceiver, a hardware control can be provided so that software can control whether or not the CDMA radio is powered during suspend state. If the radio remains powered during suspend, activity on the RI pin from the radio will resume the information handling device.

Another of the radio frequency transceivers of the FIG. 2 embodiment is a wireless LAN transceiver. Specifically, the wireless LAN transceiver can be an 802.11b compliant transceiver. Other types of wireless LAN transceivers, however, can alternatively or additionally be used.

When the wireless LAN transceiver is an 802.11b compliant transceiver, an OEM version of an Intel CF card can be used as the transceiver. This LAN transceiver can be coupled with the CF slot 208. The features of this 802.11b transceiver include: operation up to 11 Mbps; Wi-Fi certification; 100 mW transmit power; and support for WEP128. It is not required, however, that the wireless LAN transceiver be in a CF Card format. Other types of wireless LAN transceiver modules or components can also be used.

The LAN antenna can be an integrated folded sheet metal antenna that can be used by itself for non-diversity applications. When an external whip antenna is also present, however, it can be used in conjunction with the internal antenna for diversity applications. The whip antenna can use a reverse-sex center contact SMA connector. The external whip antenna can be approximately three inches in length.

Another of the radio frequency transceivers of the FIG. 2 embodiment is a wireless PAN transceiver 231. Specifically, the wireless PAN transceiver 231 can be a Bluetooth transceiver. A UHF 418 MHz radio frequency transceiver, however, provides an alternative or additional PAN transceiver 231 option. Further, other types of wireless PAN transceivers 231 can alternatively or additionally be used with the present inventions.

The Bluetooth transceiver can be used to support wireless printing when the wireless PAN includes a Bluetooth-enabled printer. Other applications are also possible, however. For example, the Bluetooth transceiver can be used to communicate with a Bluetooth-enabled cellular telephone PAN member. These applications can also be realized when other types of PAN transceivers 231 are used in the device.

The cellular connection application can be used to enable communication with a remote site. Communication with the remote site can be established through a direct cellular network connection with that site (PAN to Cellular Network to Remote Site) or by using the cellular unit to access the Internet or other such network (PAN to Cellular Network to Internet to Remote Site). Thus, communication with a remote site can be conducted even when a wireless WAN connection is not possible or desirable. Such a situation can result from malfunction, inaccessibility, interference or power consumption issues related to the use of a wireless WAN. It can also occur due to the absence or malfunction of a resident wireless WAN transceiver 226.

In FIG. 2, the Bluetooth radio interface is multiplexed 232 with the IRDA transceiver 222 onto the same UART 234. Although this arrangement permits both devices to be coupled to the system via a single UART, it also prevents the Bluetooth (or other PAN) transceiver 231 and the IRDA transceiver 222 from operating simultaneously. A hardware control is provided so that software can select between the two. A power-up switch can be used for this purpose. A software controller switch, however, can alternatively be used.

A modification of the embodiment of FIG. 2, however, will result in a system wherein the Bluetooth (or other PAN) transceiver 231 and the IRDA transceiver 222 can be operated simultaneously to each other and to the other components and systems of the information handling device. Adding an additional UART to the system and connecting the PAN transceiver 231 and the IRDA transceiver 222 each to its own UART, for example, will enable simultaneous operation.

A hardware control is provided so that software can control whether or not the Bluetooth (or other PAN) transceiver 231 is powered when the information handling device is in a suspend state. If the Bluetooth (or other PAN) transceiver 231 remains powered during Suspend, activity on the RX data pin from the radio can resume the computer. Thus, in this mode of operation, the device can be essentially in a sleep mode, but the Bluetooth (or other PAN) transceiver system 231 can still watch for incoming communications.

The features of the Bluetooth transceiver module include: a Class I transmitter (0 dBm) with a 10 meter range; RX sensitivity −70 dBm maximum; and support for Socket Communications Bluetooth stack for PocketPC. The Bluetooth antenna is integral to the radio module.

When the wireless PAN transceiver 231 is a UHF 418 MHz transceiver, the UHF data transmit only functionality at 418.00 MHz FM modulation can be provided using a transceiver such as the Radiometrix TX2 OEM radio module. The UHF radio can be used for unidirectional data transmission to a Radiometrix SILRX 418-5 FM Super heterodyne receiver. No handshaking signals are provided at the radio interface and the maximum data rate is 9600 bps. Current consumption during transmit is approximately 24 mA with an average of 10 mA during use. Typical RF power at 3 V operation at the radio antenna output port is around −3 dBm into a 50 ohm load.

The antenna can be either an internal loop or a coil antenna with no ERP gain, or an external feeder can be provided, for an operating distance of 3 m. VCC supply variance can be tolerated to +/−30%. The radio and its associated circuitry can be powered on automatically upon opening the COM port.

The embodiment of FIG. 2 can also include user interface and manual data entry components. The device can include an internal speaker 236 and microphone 238 and it can support the external headset 228 for cellular and multi-media interfacing. The speaker 236 can be located in the back of the unit (see 506, FIG. 5). The microphone 238 can be located on the lower end of the device, next to the Hirose connector (see 334, FIG. 3). The headset jack 228 can also be located on the lower end, next to the Hirose connector (see 332, FIG. 3).

In addition, two, three-color status LED's 240, 242 are included to provide indications related to the battery status, scanner or imager operation, alpha keyboard shift activation, system notifications and radio-on-during-suspend. The status LEDs can be disabled when the unit is operating off backup power or after the unit has reached critical low battery status. Two side buttons (see 602, 604, FIG. 6) are provided to serve as scanner or imager triggers.

The unit can also support an optical indicia or RFID reading handle. The handle can include the necessary optical indicia or RFID reading components. The handle attaches to the information handling device to provide additional reading functionality to the device. The reading handle can also provide a handgrip or pistol-type grip that can be used to hold the unit during operation. The grip can also used for aiming the device for a reading application. The PAN transceiver of the information handling device can be used to communicate with the reading handle. Thus, information read by the reading handle can be sent to the information handling device via the wireless PAN. The device can then store or process the information or it can forward the information to another location via one or more of its communication systems.

Various types of keyboard or keypad options can be included with a device such as that depicted in FIG. 2. For example, one configuration can include a 22-key numeric keypad and four additional buttons for navigation. The navigation buttons permit up/down and left/right movement and are activated with a finger. Another, configuration can include a 39-key alpha-numeric keypad and four navigation buttons. Further, the keypad can be backlit. Many other types and configurations of keyboards, with or without various numbers of navigation buttons, are possible. If desired, the information handling device can be constructed without any keypad or keyboard.

In one embodiment, the display 200 is a 3.8 inch, color, 240×320, reflective, TFT, LCD having 0.24 mm dot pitch that supports 64,000 colors. If desired, the CFL front light can be dimmed or turned on and off from a keypad. In addition, auto-detection of sunlight or other ambient levels, under software control, can be provided. When an X-Scale processor 218 is used, no additional LCD controller is required. The X-Scale processor 218 includes an embedded LCD controller.

A digitizer 202 capable of accepting stylus or finger input can be provided in conjunction with the display 200. The digitizer 202 can be an overlay resistive analog "touch screen." The touch screen 202 is driven by a touch screen controller. The touch screen 202 interfaces to the microprocessor 218 by a high speed serial bus 244, and provides x,y point information to the main CPU. The digitizer 202 can be used to input signatures, other handwritten information such as writing or drawings, and to accept control selections such as button presses, text selection, etc.

Automated data entry components can also be included in the device. The automated data entry components can be one-dimensional (1D) or two-dimensional (2D) optical readers or laser scanners. In addition, an RFID reader component can be included as an automated data entry component.

One or more of the following one-dimensional scanners 246, for example, can be used in conjunction with any of the various embodiments present in this specification: APS Linear Imager, SE 900 or the SE900HS. These are undecoded scanners. A Toulouse decode ASIC 248, however, can be implemented on an internal printed circuit board to interface between the above scanners 246 and the UART 250 dedicated to communicate with it. This circuitry can be included to process the raw bar code or optical information and decode it into a serial data stream (into the scanner or serial UART) for use by the application. The decode engine can be one capable of scanning several of the standard bar codes and indicia, including PDF 417, with the laser scanners 246.

Two-dimensional scanning or imaging 250 can alternatively or additionally be provided. A Welsh Allen imager, for example, supported with special circuitry and X-Scale decode algorithms, can be included to handle 2D scan codes and image capture. It is not required, however, that an automated data entry component 246, 252 be included in the various embodiments of the invention. If desired, the information handling device can be designed so as to include no such component. Also, other 1D and 2D readers can alternatively be used.

Finally, a Field-Programmable Gate Array (FPGA) 254 is provided. The FPGA is coupled between the processor 218 and the Compact Flash Slot 208, the imager 252 and the wireless WAN 226. It is also coupled with a Hardware Control Register 256, the SDRAM 220 the Flash 206 and the Ethernet 10BaseT 258. The FPGA provides a custom interface to the imager 252 and to the CF slot 208. It can be used to decode images received from the imager 252 and it can serve as a data Input/Output interface to the CF slot 208.

Figure 3:
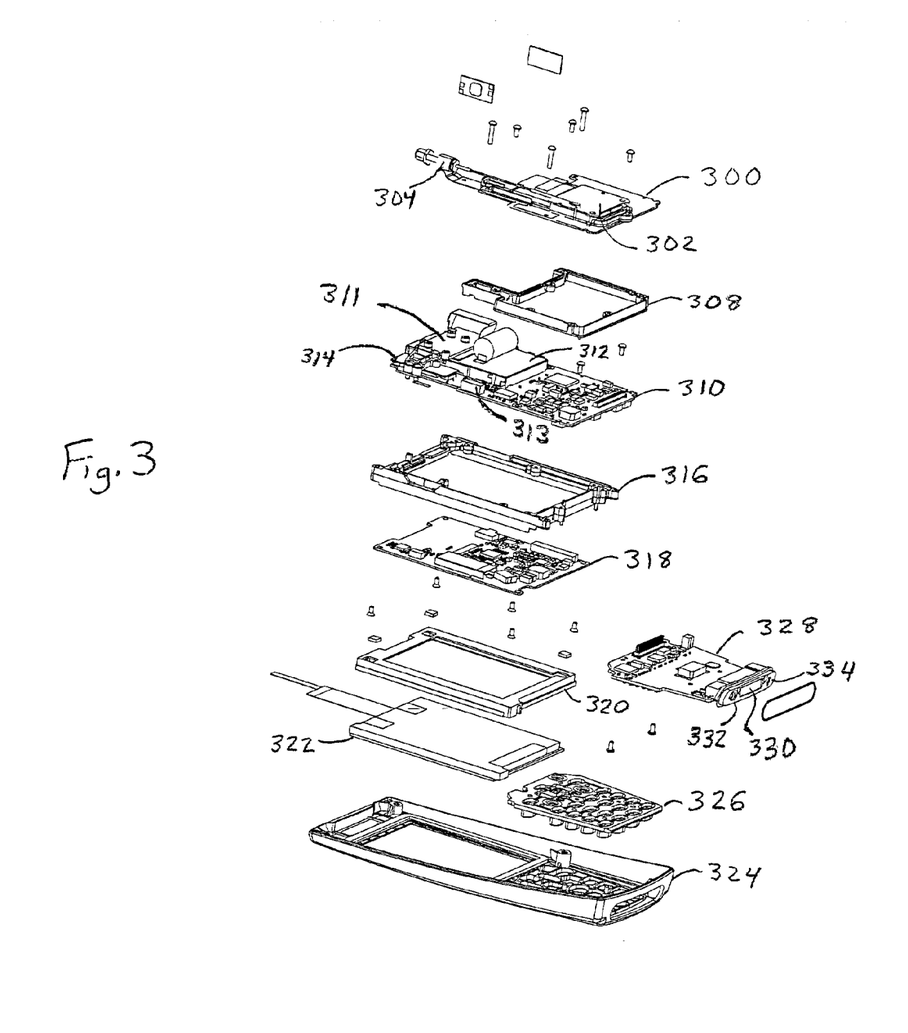
FIG. 3 is an exploded view of an embodiment of an information handling device.

FIG. 3 is an exploded view of an embodiment of an information handling device. Specifically, FIG. 3 depicts the arrangement of the components of FIG. 2 into a hand-held information handling device. It will be appreciated, however, that the embodiments discussed in relation to FIG. 1, for example, can also be arranged and assembled in the manner depicted in FIG. 3.

The peripheral board 300 is depicted at the top of FIG. 3. The peripheral board 300 supports one of the wireless communication systems 302. In this particular embodiment, the peripheral board 300 supports the wireless WAN communication system 302. The peripheral board 300 also supports an antenna 304, here an antenna 304 for the WAN communication system 302. The peripheral board 300 of FIG. 3 corresponds to the region labeled "Peripheral Board" of FIG. 2.

All of the antennas (WAN, LAN and PAN for example) are placed in the upper end (the keyboard of FIG. 3 is located at the lower end, the end nearer the operator) of the information handling device. Locating the antennas at the upper end reduces the chance that a user's hand will interfere with radio communications while holding the device. Usually, the device will not be held at the upper end. Further, the audio system can be positioned at the lower end (opposite the antenna end) of the device so that the audio will not pick up noticeable interference from the antennas.

A magnesium frame 308 is placed around the peripheral board 300 and between the peripheral board 300 and the main logic board 310. The magnesium frame 308 creates a Faraday cage, thus isolating the radio frequency system of the peripheral board 300 from the main logic board 310. The magnesium frame 308 also adds to the structural soundness of the device, thereby helping protect the systems of the device from damage due to drops or other trauma.

The main logic board of FIG. 3 corresponds to the region labeled "Main Logic Board" of FIG. 2. The main logic board 310 supports the Compact Flash slot 312. As noted above, the Compact Flash slot 312 can receive a CF 802.11b LAN radio card. In this embodiment, a wireless PAN communication system 314, here a Bluetooth radio module, is also coupled to the main logic board 310.

Figure 9:
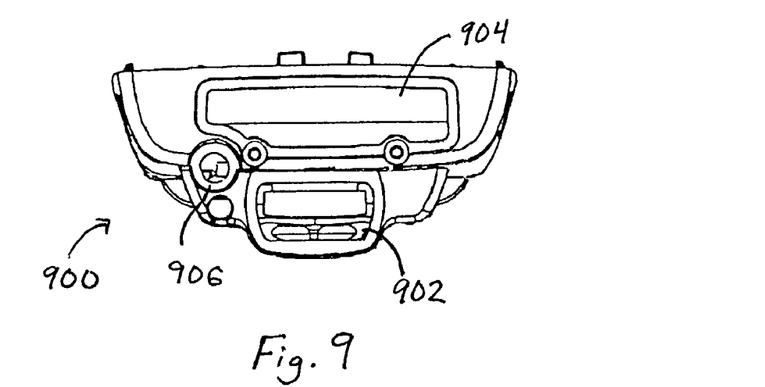
FIG. 9 depicts an upper end of an embodiment of a housing for an information handling device.

The main logic board can also support the optical reader and the IRDA transceiver. The optical reader, as discussed in relation to FIG. 2, can be a laser scanner or a digital imager. In this embodiment, the optical reader (not shown) can be positioned in the area 311 just above the CF slot 312 and near the upper end of the device. As shown in FIG. 9, the optical reader can be oriented to capture optical images through a port or window located in the upper end of the device.

The IRDA transceiver 313 is coupled to the main logic board 310. It is positioned so that it can transmit through a port or window located on the side of the housing. The window is depicted in FIG. 5 (see 508, FIG. 5).

A second magnesium frame 316 isolates the noise of the main logic board 310 and the display board 318. The display board 318 corresponds to the region labeled "LCD Interface Board" of FIG. 2. The second magnesium frame 316 also protects the display portion of the device from damage due to drops and other such shock. A rubber shock mount 320 also helps protect the display and touch panel assembly 322 from such shock.

Figure 5:
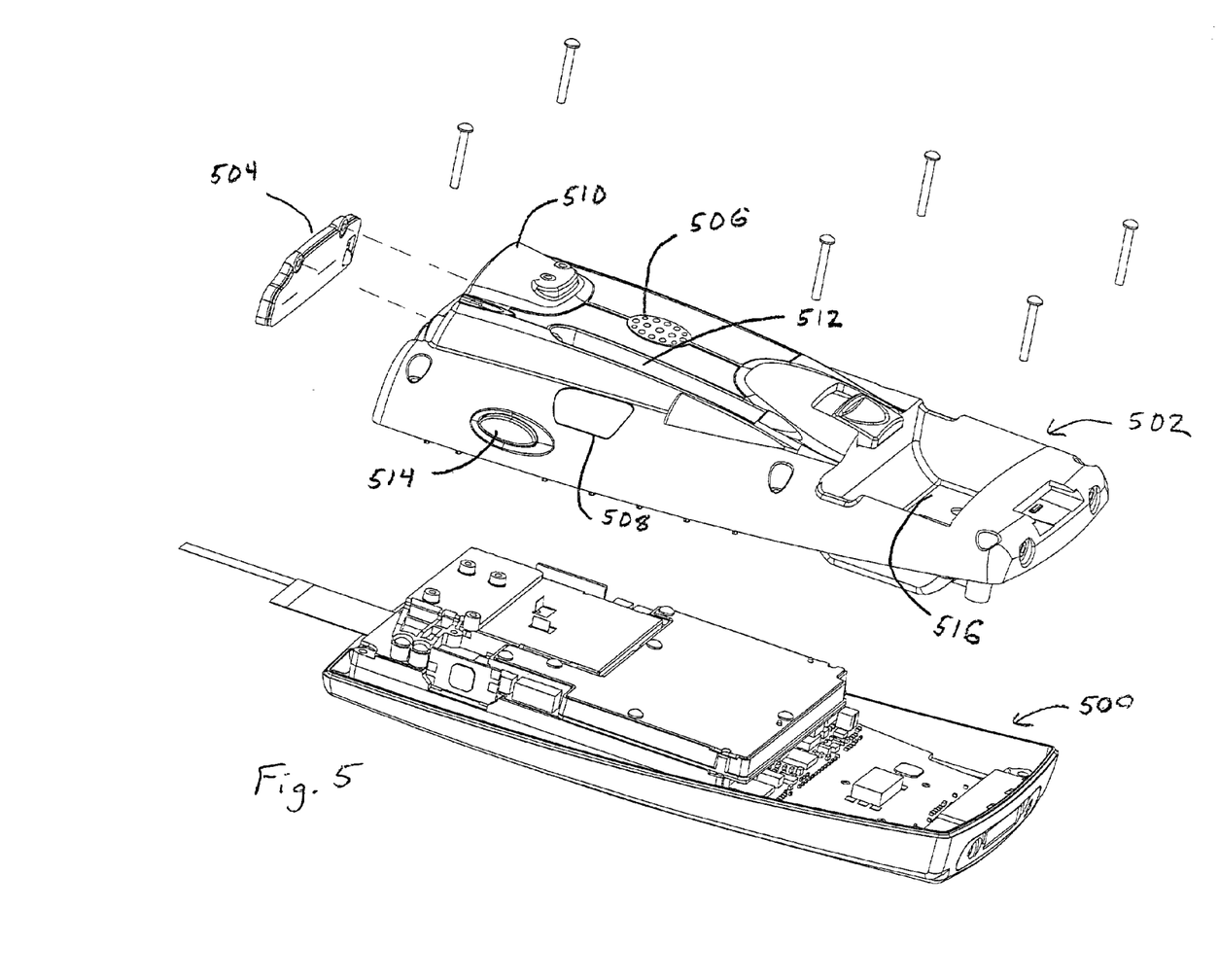
FIG. 5 is an exploded, perspective view of an embodiment of an information handling device also depicting some features of the housing.
Figure 6:
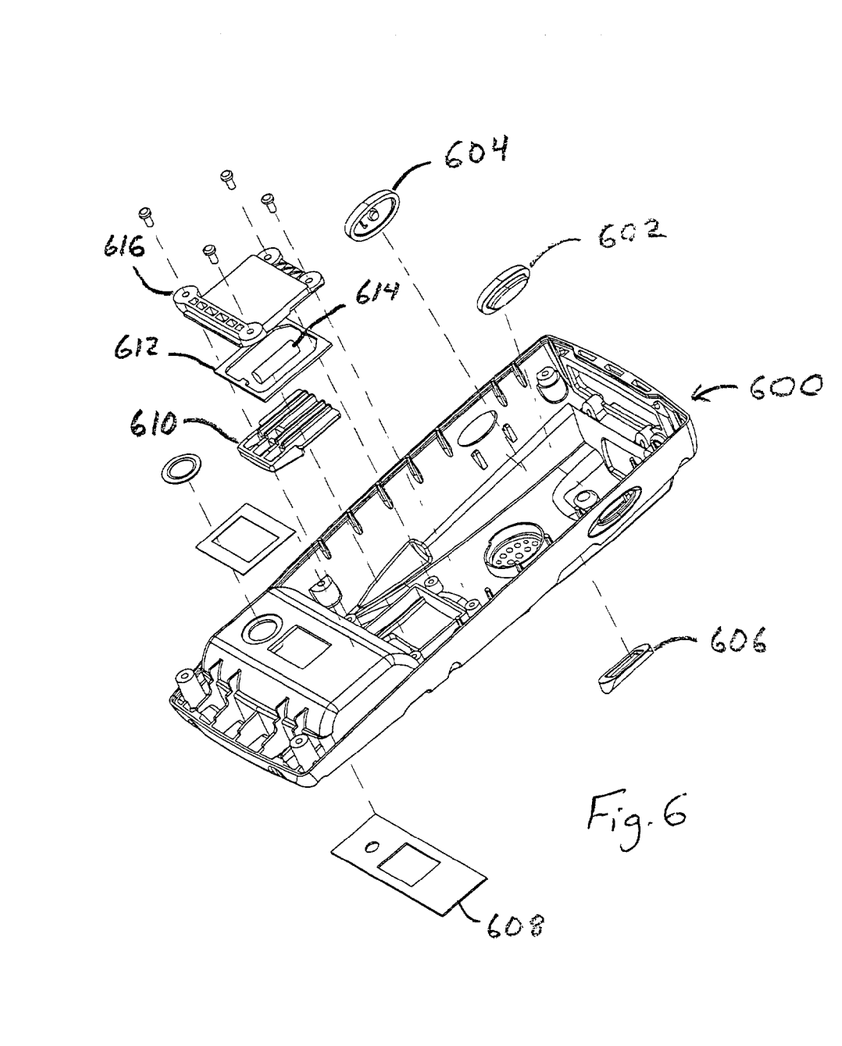
FIG. 6 depicts features related to an embodiment of a bottom portion of a housing for an information handling device.
Figure 7:
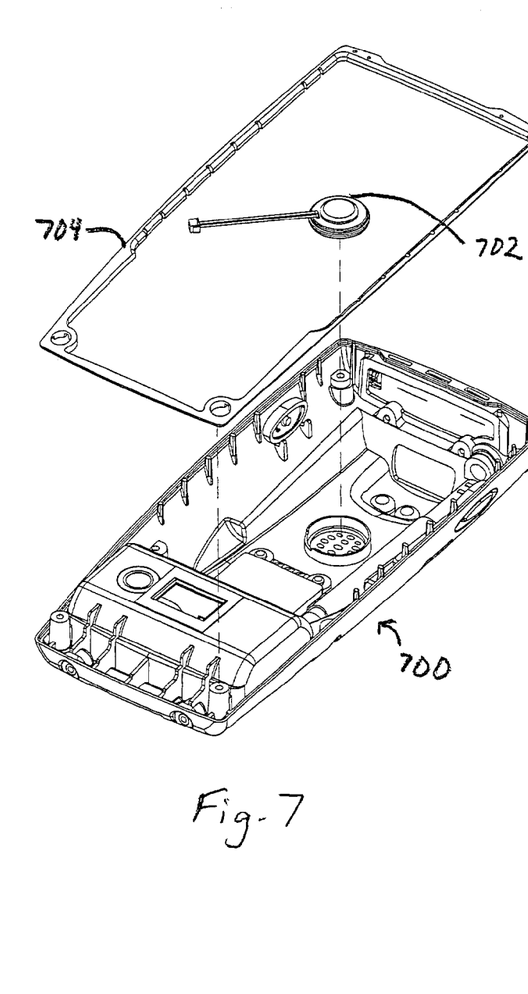
FIG. 7 depicts features related to an embodiment of a bottom portion of a housing for an information handling device.

A top housing portion 324 serves to support all of the components and systems (in conjunction with a bottom cover that is depicted in FIGS. 5-7) and to provide extra shock and environmental protection. The top housing portion 324 presents the user interfaces and the display to the user. A keypad or keyboard 326 is positioned at the lower end of the device.

A keyboard board 328 is located adjacent the keyboard or keypad 326. The keyboard board 328 corresponds to the region labeled "Keyboard" on FIG. 2. The keyboard board 328 also supports the microphone/headset connector 332, the internal microphone 334, and the Hirose connector 330 (providing Ethernet, serial port, and power connectivity).

Figure 4:
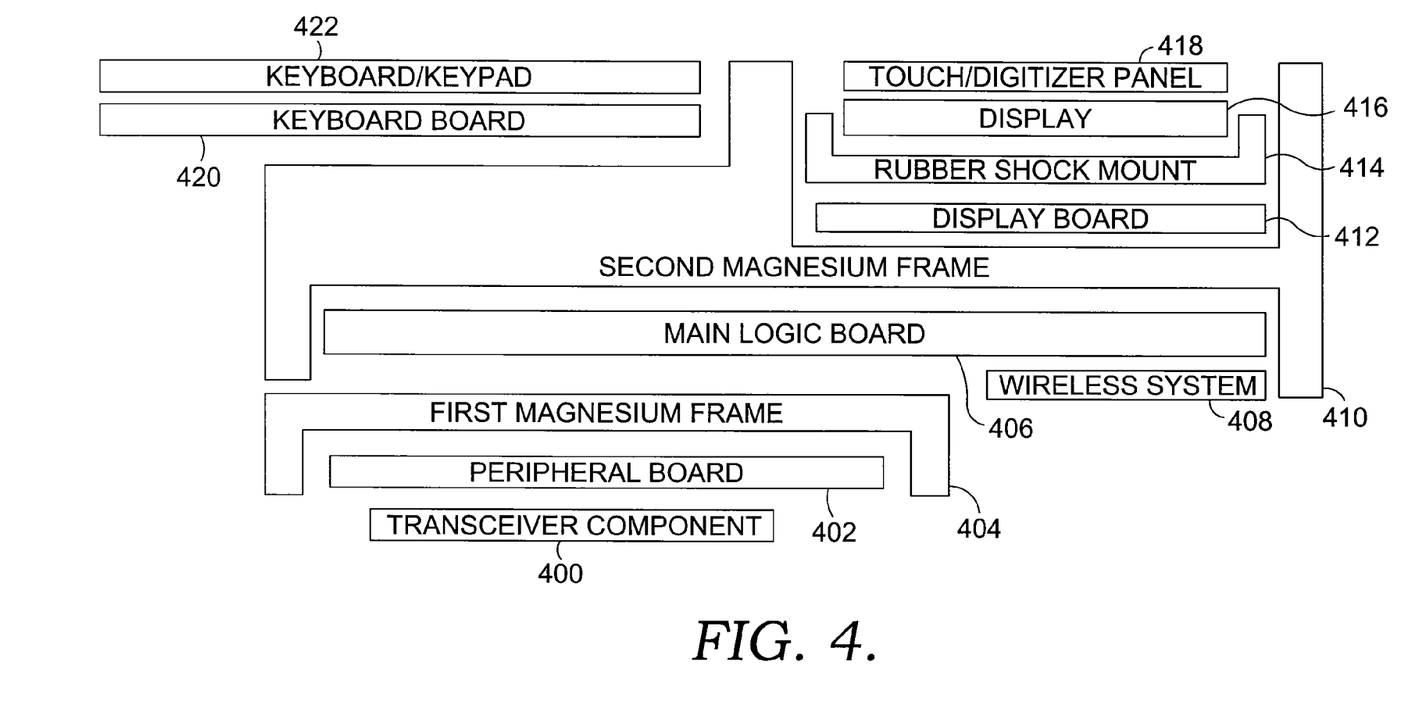
FIG. 4 is a side view of various components of an embodiment of an information handling device.

FIG. 4 presents a side view of various components of an embodiment of an information handling device. The components and systems are depicted in the manner in which they can be stacked within a hand-held information handling device. Specifically, the components depicted in FIG. 3 can be arranged as depicted in FIG. 4.

This view depicts a first wireless communication system comprising a transceiver component 400 and a peripheral board 402 which can correspond to the wireless WAN transceiver, radio/peripheral board and antenna system of FIGS. 2 and 3. FIG. 4 also depicts the first magnesium frame 404, the main logic board 406, the second wireless communication system 408 (which can correspond to the wireless PAN system of FIGS. 2 and 3), the second magnesium frame 410, the display board 412, the rubber shock mount 414, the display 416 and the touch/digitizer panel 418. FIG. 4 also depicts the arrangement of the keyboard board 420 and the keyboard/keypad 422.

FIG. 5 is a perspective view of an embodiment of an information handling device also depicting some features of the housing. The arrangement depicted in FIG. 5 can be used with the arrangement depicted in FIG. 4 for example. The stacked configuration of FIG. 4 is depicted as seated within the top housing portion 500. The bottom housing portion 502 is depicted above the top housing portion 500 and is ready for coupling therewith.

The bottom housing portion 502 includes the user-accessible Compact Flash door 504, speaker 506, IRDA window 508, reader pod 510, stylus holder 512, read trigger button 514 and battery compartment 516.

FIG. 6 depicts features related to an embodiment of a bottom portion 600 of a housing for an information handling device. The arrangement depicted in FIG. 6 can be used with the arrangement depicted in FIGS. 4 and 5 for example. Two reading/imaging triggers 602, 604 are positioned on the sides of the housing. The IRDA communication window 606 and the battery gasket 608 are also depicted. In addition, the battery pack latch 610, latch gasket 612, latch spring 614 and latch cover are depicted.

FIG. 7 depicts additional features related to the embodiment of the bottom housing portion 700 that is also depicted in FIG. 6. Specifically, FIG. 7 depicts the speaker 702 and the main gasket 704 for the information handling device.

Figure 8:
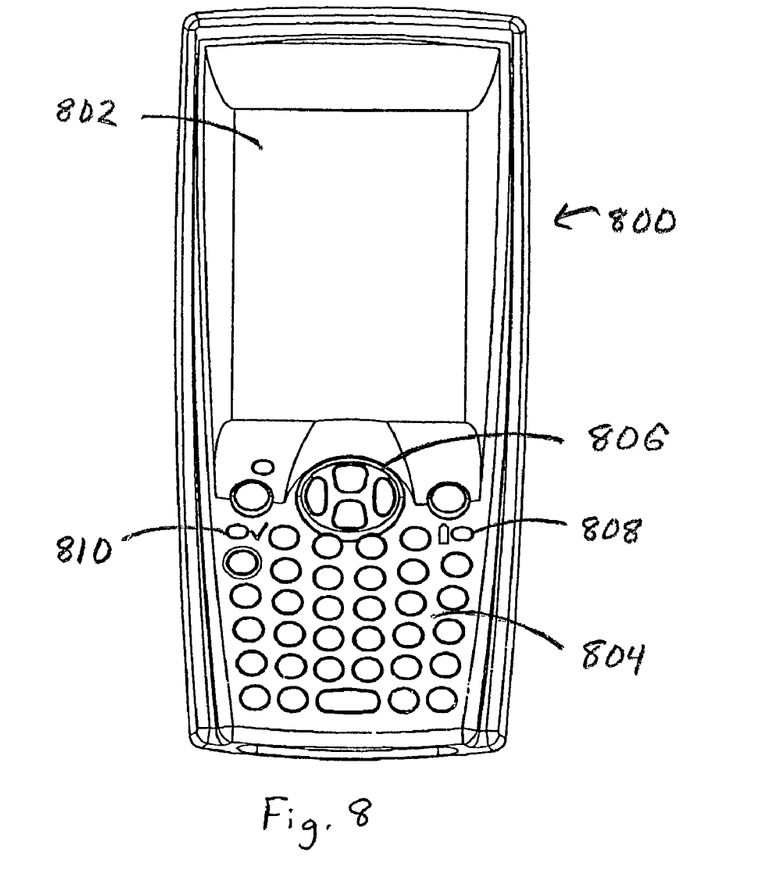
FIG. 8 depicts an external view of a face of an embodiment of a top housing portion for an information handling device.

FIG. 8 depicts an external view of a top housing portion 800 of an embodiment of a housing for an information handling device. The top housing portion 800 depicted in FIG. 8 can be mated to the bottom housing portion shown in FIGS. 5, 6 and 7 to form a ruggedized, hand-held information handling device. The external face of the top housing portion presents a display with a touch panel 802, a keyboard 804, four navigation keys 806 and two LED indicators 808, 810.

FIG. 9 depicts a portion of a upper end 900 of an embodiment of a housing for an information handling device. The upper end 900 can be, for example, the upper end for a housing such as is disclosed in FIGS. 3 through 8. The upper end portion depicted in FIG. 9 is part of the bottom housing portion (see 700, FIG. 7 for example) of the device. The upper end 900 includes the window or portal 902 through which the optical indicia reader, laser scanner or digital imager can capture optical images. Also, depicted is the CF slot door 904 and the antenna 906.

Figure 10:
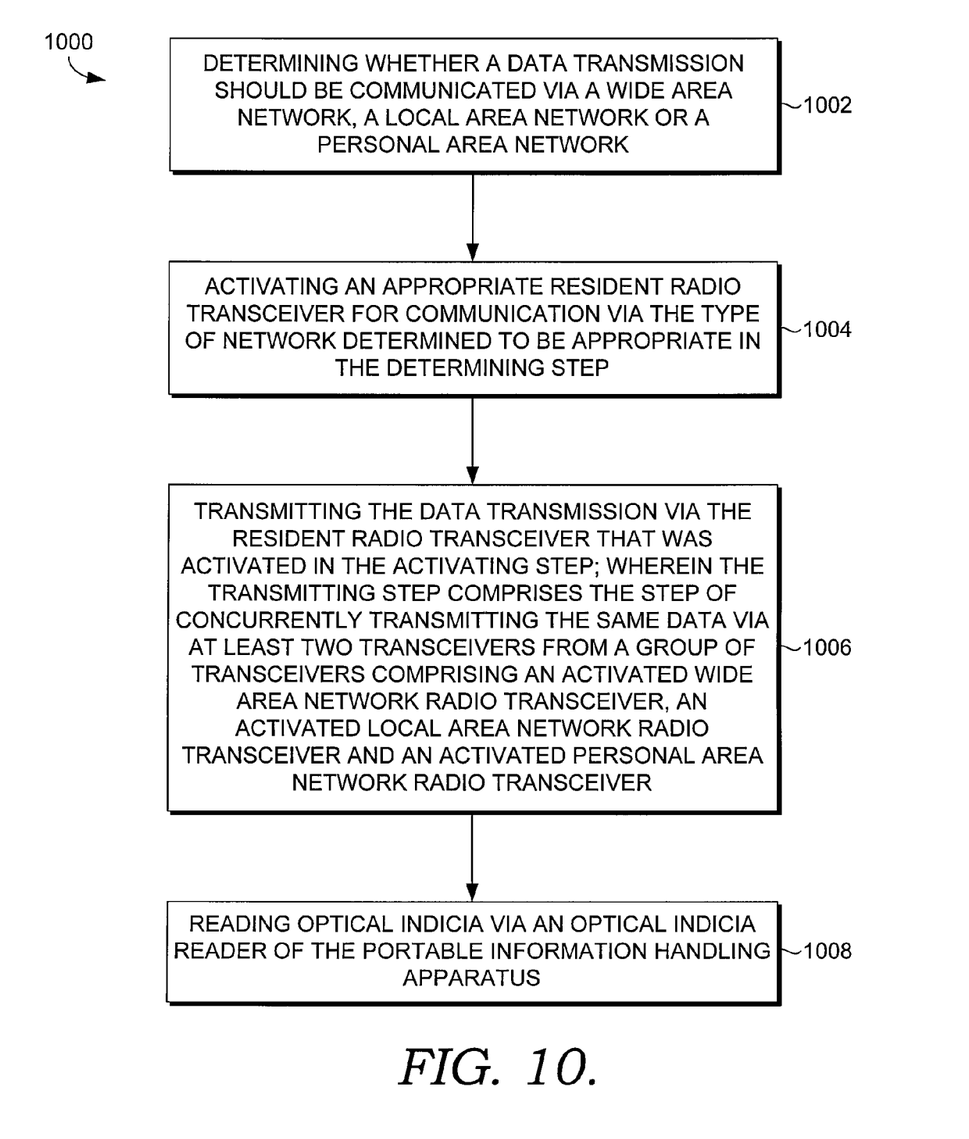
FIG. 10 is a flow chart of an exemplary method of communicating data via a portable information handling apparatus having a plurality of radio transceivers according to an embodiment of the present invention.

FIG. 10 is a flow chart of an exemplary method 1000 of communicating data via a portable information handling apparatus having a plurality of radio transceivers according to an embodiment of the present invention. At step 1002, the method 1000 determines whether a data transmission should be communicated via a wide area network, a local area network or a personal area network. At step 1004, the method 1000 activates an appropriate resident radio transceiver for communication via the type of network determined to be appropriate in step 1002. At step 1006, the method 1000 transmits the data transmission via the resident radio transceiver that was activated in step 1004. Step 1006 comprises the step of concurrently transmitting the same data via at least two transceivers from a group of transceivers comprising an activated wide area network radio transceiver, an activated local area network radio transceiver and an activated personal area network radio transceiver. At step 1008, the method 1000 reads optical indicia via an optical indicia reader of the portable information handling apparatus.

In the embodiments presented, the application having information to transmit can dictate which wireless communication system should transmit the communication. For example, an application having data to print (or to transmit for any other purpose) can be set up to transmit its data via a particular one of the wireless communication systems. In alternative embodiments, the application needing to transmit (for printing or for any other purpose) can transmit its data via a designated two, three or more of the resident wireless communication systems. As noted, the communications can be accomplished simultaneously if desired. The application having information to communicate may be, for example, an optical indicia reading application, an optical imaging application, a signature verification application, a document printing application, a data storage (file system) application, an inventory application, or any of a wide variety of other applications. Any combination of application and wireless communication system (WAN, LAN, PAN or optical for example) can be used together to communicate the desired information.

It will be apparent to one of ordinary skill in the art that the details presented above are beyond what is necessary to practice the present invention. Many variations, implementations and combinations are envisioned and disclosed. The scope of the present inventions is intended to cover all variations, omissions, substitutions and combinations which are and which may become apparent from the disclosed embodiments. The scope of the invention should be extended to the claimed invention and all of its equivalents.

What is claimed is:

1. A method of communicating data via a portable information handling apparatus having a plurality of radio transceivers, comprising the steps of:
   determining whether a data transmission should be communicated via a wide area network, a local area network or a personal area network;
   activating an appropriate resident radio transceiver for communication via the type of network determined to be appropriate in said determining step;
   transmitting the data transmission via the resident radio transceiver that was activated in said activating step; wherein said transmitting step comprises the step of concurrently transmitting the same data via at least two transceivers from a group of transceivers comprising an activated wide area network radio transceiver, an activated local area network radio transceiver and an activated personal area network radio transceiver; and
   reading optical indicia via an optical indicia reader of the portable information handling apparatus.

2. The method of claim 1, wherein said transmitting step comprises the step of concurrently transmitting data via an activated wide area network radio transceiver and an activated local area network radio transceiver.

3. The method of claim 1, wherein said transmitting step comprises the step of concurrently transmitting data via an activated wide area network radio transceiver and an activated personal area network radio transceiver.

4. The method of claim 1, wherein said transmitting step comprises the step of concurrently transmitting data via an activated local area network radio transceiver and an activated personal area network radio transceiver.

5. The method of claim 1, wherein said transmitting step comprises the step of concurrently transmitting data via an activated wide area network radio transceiver, an activated local area network radio transceiver and an activated personal area network radio transceiver.

6. The method of claim 1, wherein the optical indicia reader comprises a digital imager, further comprising the step of capturing an optical image via the digital imager.

7. The method of claim 1, wherein said transmitting step further comprises communicating a data transmission to a printer via a personal area network radio transceiver.

8. The method of claim 1, wherein said transmitting step further comprises communicating a data transmission to a cellular telephone unit via a personal area network radio transceiver.

9. The method of claim 1, wherein said transmitting step further comprises communicating a data transmission to a personal area network capable unit via a personal area network radio transceiver.

10. The method of claim 1, wherein said transmitting step comprises transmitting an image.

\* \* \* \* \*

UNITED STATES PATENT AND TRADEMARK OFFICE
CERTIFICATE OF CORRECTION

PATENT NO. : 7,580,395 B2  Page 1 of 1
APPLICATION NO. : 10/307221
DATED : August 25, 2009
INVENTOR(S) : Boatwright et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1551 days.

Signed and Sealed this

Fourteenth Day of September, 2010

David J. Kappos
*Director of the United States Patent and Trademark Office*